Figure 1:
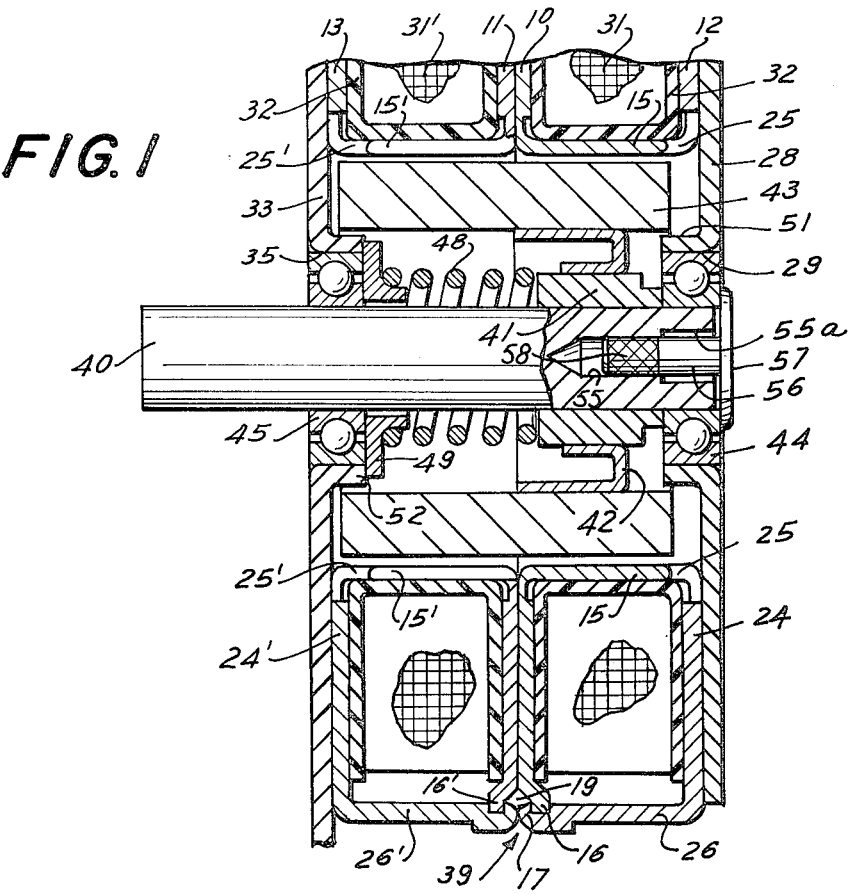

United States Patent [19]

Manson

[11] 4,438,361

[45] Mar. 20, 1984

[54] STEPPER MOTOR HAVING ROTOR WITH LIMITED AXIAL MOVEMENT

[75] Inventor: Harry G. Manson, Princeton, Ind.

[73] Assignee: IMC Magnetics Corp., Jericho, N.Y.

[21] Appl. No.: 351,819

[22] Filed: Feb. 24, 1982

[51] Int. Cl.³ ............................................. H02K 7/08
[52] U.S. Cl. .................. 310/90; 310/49 R; 310/66; 308/236
[58] Field of Search ............... 310/49, 162, 163, 164, 310/90, 66, 191, 79, 90 MM, 156, 209; 70/182; 464/180; 308/236, 189 A

[56] References Cited

U.S. PATENT DOCUMENTS

| Re. 28,075 | 12/1967 | Kavanaugh | 310/49 R |
|---|---|---|---|
| 1,713,024 | 5/1929 | Carhart | 308/236 UX |
| 1,896,265 | 2/1933 | Weichsel | 310/90 UX |
| 2,193,713 | 3/1940 | Cole | 310/90 |
| 2,832,906 | 4/1958 | Koons | 310/90 |
| 3,080,106 | 3/1963 | Ayling | 310/90 |
| 3,082,338 | 3/1963 | Turk | 310/90 |
| 3,418,504 | 12/1968 | Paule | 310/90 |
| 3,633,055 | 1/1972 | Maier | 310/162 |
| 4,040,685 | 8/1977 | Berglund | 308/236 |
| 4,107,559 | 8/1978 | Patel | 310/49 R |

Primary Examiner—R. Skudy
Attorney, Agent, or Firm—Alan H. Levine

[57] ABSTRACT

A stepper motor having a stator and a rotor, the rotor having a shaft formed with an axial bore. A pair of bearings carried by the stator rotatably support the shaft. A stud is fixed within the bore and has an enlarged head extending radially beyond the external contour of the shaft into axial alignment with at least part of one of the bearings. Engagement between the stud head and the bearing limits axial movement of the rotor with respect to the bearing.

6 Claims, 2 Drawing Figures

U.S. Patent     Mar. 20, 1984     4,438,361

STEPPER MOTOR HAVING ROTOR WITH LIMITED AXIAL MOVEMENT

This invention relates to stepper motors, such as those illustrated and described in U.S. Pat. No. Re. 28,075 (particularly FIGS. 6 and 8) and U.S. Pat. No. 3,633,055. More specifically, the invention relates to limiting the axial movement, also referred to as "end play", of the stepper motor rotor with respect to the bearings which rotatably support it.

The rotor shaft usually extends beyond the bearings which support it, and often an annular groove is formed in the shaft, the groove accommodating a snap ring. Engagement between the snap ring and the baring to which it is adjacent limits the end play of the rotor with respect to the bearings. However, since the groove is always somewhat wider than the thickness of the snap ring, some end play is always present. End play can be eliminated by replacing the snap ring with a more expensive collar having a set screw or screw adjustment collar.

It is an object of the present invention to provide a stepper motor including a very inexpensive means for eliminating, or limiting to a small amount, whichever is desired, axial movement between the rotor and the bearings which support it.

It is another object of the invention to provide such a stepper motor wherein a simple stud, press fit into a bore at one end of the rotor shaft, cooperates with one of the bearings to limit end play of the rotor.

Additional objects and features of the invention will be apparent from the following description in which reference is made to the accompanying drawings.

Figure 2:
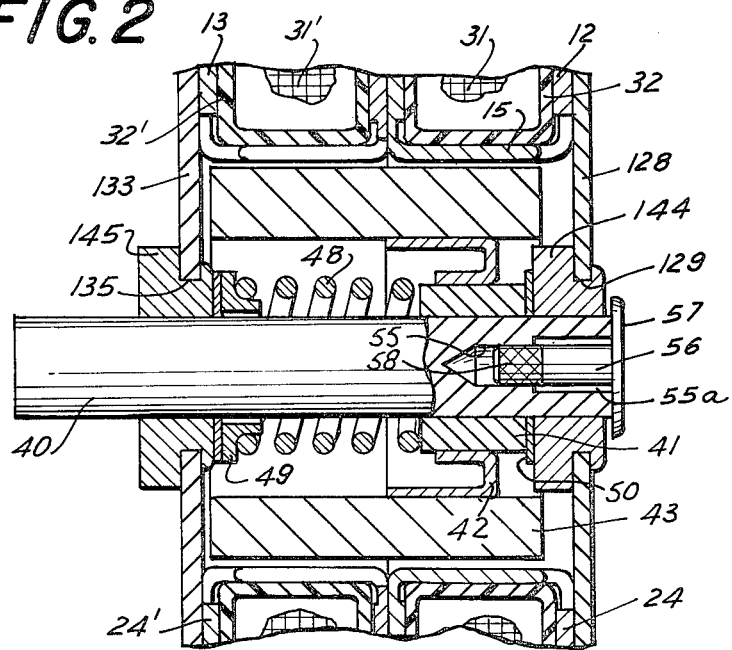

In the drawings:

FIG. 1 is a fragmentary axial cross-sectional view of a stepper motor according to the invention; and FIG. 2 is a view similar to FIG. 1 showing an alternative embodiment of a stepper motor according to the invention.

The stepper motor chosen to illustrate the present invention is of the type shown and described in more detail in copending application Ser. No. 285,657, now U.S. Pat. No. 4,355,248 filed July 21, 1981. The stepper motor includes two stator plates 10 and 11 and two stator cups 12 and 13. Stator plates 10 and 11 are virtually identical, each being of annular shape. A plurality of tapered poles 15 surround the central opening of stator plate 10, the poles being circumferentially spaced apart. All the poles 15 project perpendicularly in the same direction from the plane of plate 10. The peripheral margin 16 of the plate is deformed out of the plane of the plate in the direction in which poles 15 project from the plate.

Stator plate 11 is substantially identical to plate 10, and the parts of plate 11 corresponding to those of plate 10 bear the same reference numerals employed above, followed by a prime. In order to form the inner stator member of the stepper motor, stator plates 10 and 11 are placed back-to-back and permanently fixed together, such as by welding or by a suitable adhesive.

Stator cup 12 is of annular shape, having a central opening in its back wall 24. A plurality of tapered poles 25 surround the central opening, the poles being circumferentially spaced apart. All the poles 25 project perpendicularly in the same direction from the plane of back wall 24 of the cup. A peripheral side wall 26 projects from back wall 24 in the direction in which poles 25 project from the back wall. The free edge 27 of side wall 26 is enlarged in diameter so that the internal diameter of free edge 27 is about equal to the external diameter of stator plate 10, whereby the peripheral edge 16 of plate 10 fits snugly within edge 27 of cup 12.

Stator cup 13 is substantially identical to cup 12, and the parts of cup 13 corresponding to those of cup 12 bear the same reference numerals employed above, followed by a prime. A bearing attachment plate 28, having a central opening 29, is fixed to the outer face of back wall 24 of stator cup 12, such as by welding or a suitable adhesive, and a bearing attachment plate 33, having a central opening 35, is similarly fixed to the outer face of back wall 24' of stator cup 13. Plate 33 may be larger than plate 28, and provided with mounting holes (not shown) near its extremities, so that it can serve as a mounting plate for the stepper motor.

A coil of electrical wire 31 wound on a spool 32 surrounds poles 15 and 25 of plate 10 and cup 12, respectively, and a similar coil 31' wound on a spool 32' surrounds poles 15' and 25' of plate 11 and cup 13, respectively. The free edges 27 and 27' are staked into the gap 19 to thereby permanently mechanically join each stator cup 12 and 13 to its respective stator plate 10 and 11.

The rotor, which cooperates with the stator described above, includes a shaft 40, a hub 41 surrounding and fixed to the shaft, an annular support 42 surrounding and fixed to the hub, and a tubular permanent magnet 43 surrounding and fixed to the support. Shaft 40 is rotatably supported within two ball bearings 44 and 45, spaced apart along the length of the shaft. A compression spring 48 surrounds a portion of shaft 40 between the bearings, one end of the spring being seated around a collar 49, within which the shaft rotates, and the other end of the spring pressing against hub 41.

Attachment plate 28 is formed, such as by a drawing operation, with an inwardly projecting boss 51 surrounding opening 29. The outer race of bearing 44 is fixed within the boss. Similarly, attachment plate 33 is formed with an inwardly projecting boss 52 surrounding opening 35. The outer race of bearing 45 is fixed within boss 52.

The end of shaft 40 adjacent to bearing 44 is provided with a non-threaded axial bore 55. The portion of bore 55 which is closer to the end of shaft 40 is enlarged in diameter, as indicated at 55a. Tightly press fit within the bore 55 is a stud 56 having an enlarged head 57. At least the inner end portion of stud 56 is knurled, at 58, to increase the tight frictional engagement between the stud and the wall of bore 55.

The diameter of head 57 is larger than that of shaft 40, so that the outer radial portion of the head is axially aligned with at least the inner race of bearing 44. The enlarged diameter portion 55a of bore 55 is not engaged by stud 56 as the latter is driven into the bore, and hence the end portion of shaft 40 does not expand in the region surrounded by the inner race of bearing 44. Thus, the bearing race is not distorted by insertion of the stud into bore 55.

In the embodiment of FIG. 1, the end of shaft 40 having bore 55 is recessed slightly behind the axially outer face of bearing 44. As a result, head 57 of stud 56 fits tightly against the axially outer face of the inner race of bearing 44 and thereby prevents any axial movement, or end play, of the rotor with respect to the bearing, and hence with respect to the stator.

In the embodiment of FIG. 2, those parts which are identical to parts in FIG. 1 bear the same reference numerals as in the previous figure. Parts which are of similar functions bear the same reference numerals as in FIG. 1, preceded by "1".

In FIG. 2, sleeve bearings 144 and 145 are used instead of ball bearings. The sleeve bearings, which may be of sintered bronze, are fixed within openings 129 and 135 of attachment plates 128 and 133. Bearing 144 has an annular groove for accommodating the edge of plate 128 surrounding opening 129, and bearing 145 has an annular groove for accommodating the edge of plate 133 surrounding opening 135. Since hub 41 rotates and bearing 144 does not, a low friction washer 50 is provided between the hub and the bearing.

The end of shaft 40 having bore 55 projects slightly beyond the axially outer face of bearing 144 when the stepper motor is deenergized. Stud 56 is driven into bore 55 until head 57 touches the end of the shaft. The spacing between head 57 and bearing 144 determines the amount of axial movement, or end play, permitted between the rotor and the bearings while the motor is in operation.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A stepper motor comprising:
   a stator,
   a rotor rotatable with respect to the stator, the rotor having a shaft formed with a non-threaded axial bore,
   bearing attachment means carried by the stator,
   a pair of bearings carried by the bearing attachment means for rotatably supporting the rotor shaft, and
   a stud frictionally, but non-threadably, fixed within the shaft bore, the stud having an enlarged head extending radially beyond the external contour of the shaft into axial alignment with at least part of one of the bearings,
   whereby engagement between the stud head and the bearing limits the amount of axial movement of the rotor with respect to the bearing.

2. A stepper motor as defined in claim 1 wherein the bore extends from one end of the shaft for a distance less than the length of the shaft.

3. A stepper motor as defined in claim 2 wherein the stud head is axially spaced from said one end of the shaft and engages said one of the bearings, to prevent any axial movement of the rotor with respect to the bearing.

4. A stepper motor as defined in claim 2 wherein the stud head engages said one end of the shaft and is spaced from said one of the bearings when the motor is deenergized, to permit limited axial movement of the rotor with respect to the bearing.

5. A stepper motor as defined in claim 1 wherein the stud has a knurled external surface to increase the friction between the stud and the wall of the bore.

6. A stepper motor as defined in claim 1 wherein the diameter of the bore is greater than the diameter of the stud in the region of the shaft radially aligned with said one of the bearings.

* * * * *